(12) United States Patent
Colavito et al.

(10) Patent No.: US 9,697,403 B2
(45) Date of Patent: Jul. 4, 2017

(54) INDICIA-READER HAVING UNITARY-CONSTRUCTION

(71) Applicant: Hand Held Products, Inc., Fort Mill, SC (US)

(72) Inventors: Stephen Colavito, Garnet Valley, PA (US); Kevin Saber, Sewell, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/185,476

(22) Filed: Jun. 17, 2016

(65) Prior Publication Data

US 2016/0292479 A1    Oct. 6, 2016

Related U.S. Application Data

(63) Continuation of application No. 14/150,393, filed on Jan. 8, 2014, now Pat. No. 9,373,018.

(51) Int. Cl.
  *G06K 7/10* (2006.01)
  *G06K 7/14* (2006.01)

(52) U.S. Cl.
  CPC ....... *G06K 7/10881* (2013.01); *G06K 7/1443* (2013.01)

(58) Field of Classification Search
  CPC .................................................. G06K 7/10881
  USPC ........................... 235/462.45, 462.47, 472.01
  See application file for complete search history.

(56) References Cited

U.S. PATENT DOCUMENTS

| | | | |
|---|---|---|---|
| 5,396,055 A | 3/1995 | Shepard et al. | |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,673,804 B1 | 3/2010 | Hinson et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 13/367,978, filed Feb. 7, 2012, (Feng et al.); now abandoned.

(Continued)

*Primary Examiner* — Toan Ly
(74) *Attorney, Agent, or Firm* — Additon, Higgins & Pendleton, P.A.

(57) ABSTRACT

A hand-held indicia-reading device includes a housing and a cable having a unitary-construction. The indicia-reader has a head portion with an indicia-reading system including a printed circuit board. The entire handle portion of the reader is typically over-molded onto a host-connector cable. The host-connector cable includes a circuit board connector on one end and a connector for connecting to a host at an opposite end extending from a base portion of the handle.

20 Claims, 4 Drawing Sheets

(56) References Cited

U.S. PATENT DOCUMENTS

| | | |
|---|---|---|
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 9,373,018 B2 | 6/2016 | Colavito et al. |
| 2006/0093278 A1 | 5/2006 | Elkins, II et al. |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedrao |
| 2013/0306734 A1 | 11/2013 | Xian et al. |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |

(56) References Cited

U.S. PATENT DOCUMENTS

| | | |
|---|---|---|
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131445 A1 | 5/2014 | Ding et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

OTHER PUBLICATIONS

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

U.S. Appl. No. 14/274,858 for Mobile Printer With Optional Battery Accessory, filed May 12, 2014, (Marty et al.), 26 pages.

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

(56) References Cited

OTHER PUBLICATIONS

U.S. Appl. No. 14/222,994 for Method and Apparatus for Reading Optical Indicia Using a Plurality of Data filed Mar. 24, 2014 (Smith et al.); 30 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 14 pages.

INDICIA-READER HAVING UNITARY-CONSTRUCTION

CROSS-REFERENCE TO RELATED APPLICATION

The present application claims the benefit of U.S. patent application Ser. No. 14/150,393 for an Indicia-Reader Having Unitary-Construction filed Jan. 8, 2014 (and published Jul. 9, 2015 as U.S. Patent Publication No. 2015/0193645), now U.S. Pat. No. 9,373,018. Each of the foregoing patent application, patent publication, and patent is hereby incorporated by reference in its entirety.

FIELD OF THE INVENTION

The present invention relates to the field of indicia-readers and, more specifically, to hand-held indicia-readers having a unibody handle that surrounds an integrated cable.

BACKGROUND

Hand-held indicia-reading devices such as hand-held mobile computers and bar code scanners are used in numerous environments for various applications (e.g., hospitals, warehouses, delivery vehicles, etc.). For example, a large percentage of retailers, notably grocery stores and general consumer merchandisers, rely on barcode technology to improve the efficiency and reliability of the checkout process.

Many kinds of hand-held indicia-reading devices utilize a traditional gun-shaped design (e.g., form factor). During the retail checkout process, for instance, a gun-style hand-held indicia-reader is generally used by the cashier to provide additional flexibility (e.g., for coupon checking, loyalty card scanning, or shopping cart scanning). The gun-shaped form factor provides an indicia-reader that is easy to handle and use for intensive hand-held scanning.

One of the design challenges of hand-held indicia-readers, including those having a traditional gun-shaped form factor, is that the reader's shape does not lend itself to easily placing all electronics, including connectors, onto a single printed circuit board (PCB). This is because the scanning electronics typically reside in the top portion of the indicia-reader (i.e., the head) while the host connection point is generally located at the bottom of the handle. Accordingly, this kind of design often requires the use of an internal cable that electrically connects the host connector to the PCB containing the electronics.

The requirement of an internal cable to electrically connect the host connector to the PCB results in a number of disadvantages. For instance, the addition of the internal cable adds to the overall cost of the indicia-reader. The internal cable also provides a potential failure point during the life of the product.

Furthermore, the handle of a traditional hand-held indicia-reader is typically a complicated mechanical part that has both plastic and rubber individual components that must be assembled. These individual mechanical parts increase costs associated with designing and manufacturing the indicia-reader. As one example, a mechanical part at the host connection point (i.e., a handle's end cap) is often required to complete the handle assembly.

Manufacturing the handle may also require more complex tooling including a secondary over-mold process. These additional steps likewise increase costs.

Moreover, because host cable may be subjected to high instances of flexing, the cable typically requires a strain relief at the base of the handle.

SUMMARY

Accordingly, in one aspect, the present invention embraces an indicia-reading device that can include an indicia-capturing subsystem for acquiring information about indicia within the indicia-capturing subsystem's field of view and an indicia-decoding subsystem configured for decoding indicia information acquired by the indicia-capturing subsystem. The indicia-reading device can also include a hand-supportable housing having a head portion and an adjacent handle portion, wherein (i) the head portion substantially encloses the indicia-capturing subsystem and the indicia-decoding subsystem, and (ii) the handle is formed as a unitary-construction.

In an exemplary embodiment, the indicia-reading device may include a host-connector cable, the host-connector cable being integrated into and surrounded by the hand-supportable housing's unitary-construction handle.

In another exemplary embodiment, the host-connector cable can have a first end connector at an upper portion of the handle and a second end connector at a base portion of the handle.

In yet another exemplary embodiment, the indicia-capturing subsystem can include a printed circuit board operatively connected to electro-optical components.

In yet another exemplary embodiment, the first end connector can be operatively connected to the printed circuit board.

In yet another exemplary embodiment, the second end connector can be operatively connected to a host.

In yet another exemplary embodiment, the host can be a computer.

In yet another exemplary embodiment, the hand-supportable housing's head portion can be removably connected to the hand-supportable housing's unitary-construction handle.

In yet another exemplary embodiment, the hand-supportable housing's unitary-construction handle can be an injection-molded handle.

In yet another exemplary embodiment, the hand-supportable housing's unitary-construction handle can be a blow-molded handle.

In another aspect, the present invention embraces an indicia-reading device that can include a hand-supportable housing. The hand-supportable housing can include a head portion and an adjacent handle portion. The head portion at least partially encloses an indicia-capturing system. The indicia-capturing system can include (i) an indicia-capturing subsystem for acquiring information about indicia within the indicia-capturing subsystem's field of view, and (ii) an indicia-decoding subsystem configured for decoding indicia information acquired by the indicia-capturing subsystem. The handle portion can physically integrate a host connector cable forming a single part.

In an exemplary embodiment, the host-connector cable can have a first end connector at an upper portion of the handle and a second end connector at a base portion of the handle.

In another exemplary embodiment, the indicia-capturing system can include a printed circuit board operatively connected to electro-optical components In yet another exemplary embodiment, the first end connector can be operatively connected to the printed circuit board.

In yet another exemplary embodiment, the second end connector can be operatively connected to a host.

In yet another exemplary embodiment, the host can be a handheld computer.

In yet another exemplary embodiment, the head portion can be removably attached to the handle portion.

In yet another exemplary embodiment, the head portion can be removably attached to the handle portion by fasteners.

In another aspect, the present invention embraces a method for reading indicia. The method can include providing an indicia-reading device that includes (i) an indicia-capturing subsystem for acquiring information about indicia within the indicia-capturing subsystem's field of view, (ii) an indicia-decoding subsystem configured for decoding indicia information acquired by the indicia-capturing subsystem, (iii) a hand-supportable housing having a head portion and an adjacent handle portion, wherein the head portion substantially encloses the indicia-capturing subsystem and the indicia-decoding subsystem and the handle is formed as a unitary-construction, and (iv) a host-connector cable, the host-connector cable being integrated into and surrounded by the hand-supportable housing's unitary-construction handle. The method can further include operatively connecting the host-connector cable to a host and using the indicia-reading device to acquire indicia information.

In an exemplary embodiment, the method for reading indicia can further include communicating the indicia information from the indicia-reading device to the host via the host-connector cable.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces indicia-readers. In particular, the present invention embraces hand-held indicia-readers having a unibody handle (i.e., the handle is formed as a unitary-construction).

The term indicia as used herein is intended to refer broadly to various types of machine-readable indicia, including barcodes, QR codes, matrix codes, 1D codes, 2D codes, RFID tags, characters, etc. The indicia are typically graphical representations of information (e.g., data) such as product numbers, package tracking numbers, or personnel identification numbers. The use of indicia-readers to input data into a system, rather than manual data entry, results in generally faster and more reliable data entry.

One exemplary type of hand-held indicia-reader that can include a housing that is directly integrated with a cable is a gun-style hand-held indicia-reader. References herein to particular kinds of devices or device environments, however, are not intended to limit the disclosure to particular devices, and those having ordinary skill in the art will recognize that a number of different devices might be employed.

Figure 3:
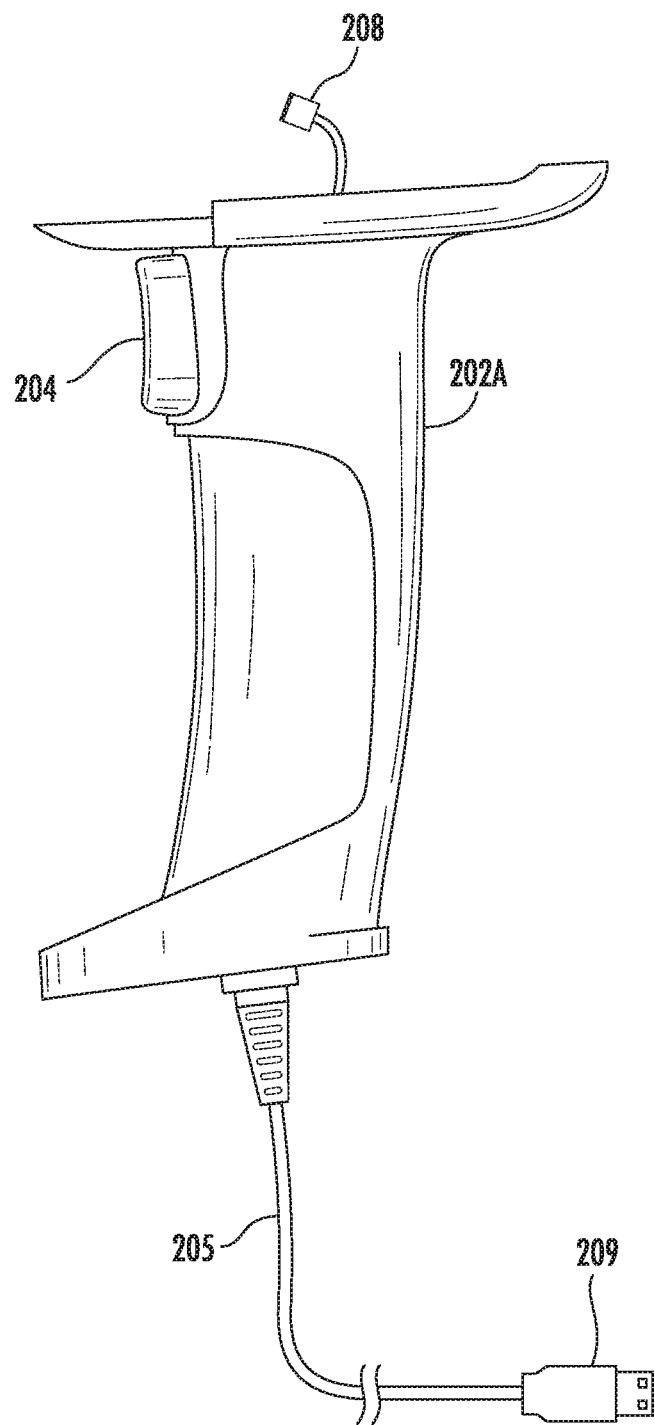
FIG. 3 depicts the handle portion of an exemplary hand-held indicia-reader according to the present invention.
Figure 4:
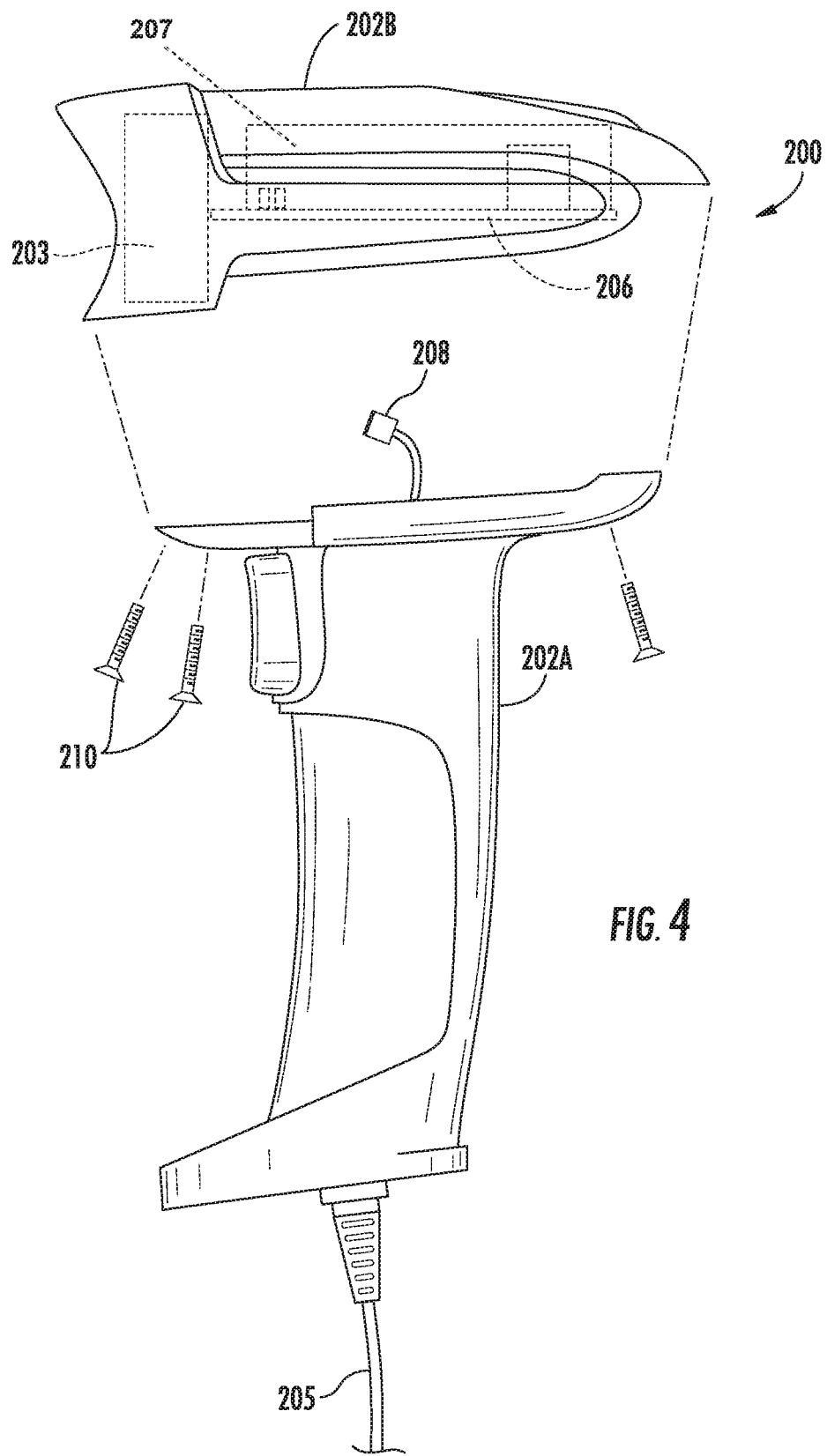
FIG. 4 depicts an exploded view of an exemplary hand-held indicia-reader according to the present invention.

The exemplary hand-held indicia-readers of the present invention provide manufacturing efficiencies and cost savings by eliminating the need for many individual mechanical parts that are typically required when manufacturing indicia-reader housings. The resulting hand-held indicia-readers are simpler and less expensive to make. These advantages are illustrated (below) in comparing a typical hand-held indicia-reader (FIGS. 1 and 2) with an exemplary hand-held indicia-reader of the present invention (FIGS. 3 and 4).

Figure 1:
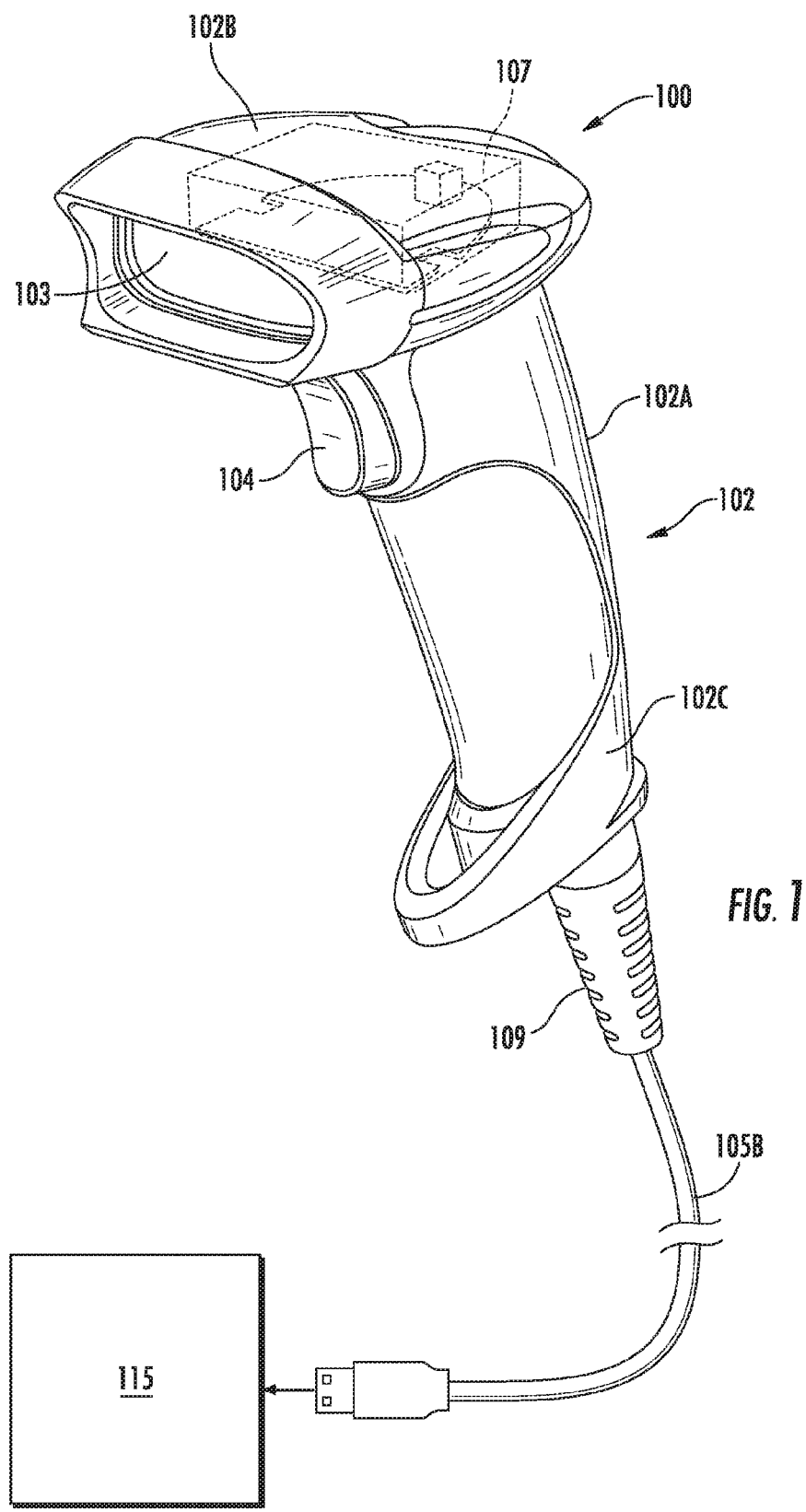
FIG. 1 depicts a perspective view of a typical hand-held indicia-reader.

Referring now to the drawings, FIG. 1 depicts a typical hand-held indicia-reader (i.e., a hand-held scanner). Specifically, FIG. 1 depicts a typical gun-style hand-held indicia-reader 100. The indicia-reader 100 includes a hand-supportable housing 102 having a handle portion 102A.

The hand-held scanner's housing 102 has a head portion 102B that includes a light transmission window 103 within the housing's head portion 102B.

An indicia-reading system 107 may be enclosed within the head portion 102B. In some instances, the indicia-reading system 107 may include laser scanning subsystems (i.e., indicia-capturing subsystems) that sweep light beams (e.g., a laser beam) across a scan path (i.e., a field of view) and then receive the optical signals that reflect or scatter off the indicium. Typically, the optical signal is received using a photoreceptor (i.e., photodiode) and is converted into an electrical signal. The electrical signal is an electronic representation of the indicia information (e.g., the data represented by the indicia). When in the form of an electrical signal, this information can be processed (i.e., decoded) by an indicia-decoding subsystem.

In other instances, the indicia-reading system 107 may include imaging subsystems or some combination of imaging subsystems and laser scanning subsystems (i.e., indicia-capturing subsystems). The imaging subsystem captures digital images of objects within the subsystem's field of view. When the indicia information takes the form of a digital image, the indicia information is typically processed by an indicia-decoding subsystem through the use of image-processing software (e.g., optical character recognition (OCR) technology), which can both identify the presence of indicia in the digital image and decode the indicia.

A manually actuated trigger switch 104 may be depressed to activate the indicia-reading system 107 (i.e., the scanning module).

The base structure 102C of the hand-held scanner's housing may include a cable strain relief 109 and an external host connector cable 105B. The external host connector cable 105B (e.g., a USB cable) can be used as a bus for connection, communication, and power supply between the reader 100 and a host 115 (e.g., a computer).

Figure 2:
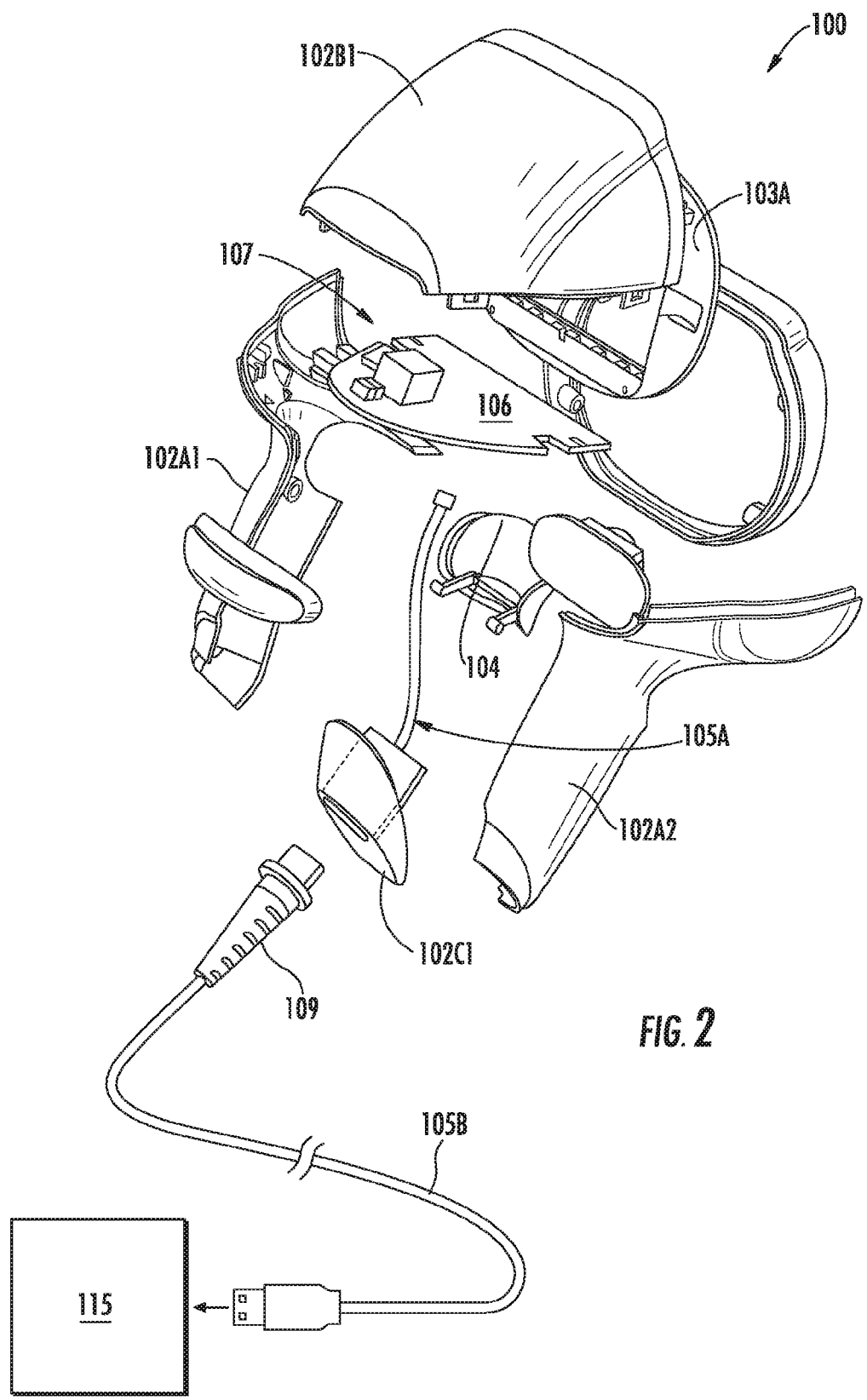
FIG. 2 depicts a perspective exploded view of a typical hand-held indicia-reader.

FIG. 2 depicts an exploded view of a typical gun-style indicia-reader 100. The hand-supportable housing 102 includes left and right handle halves 102A1 and 102A2; a foot-like end-cap structure 102C1 that is mounted between the handle halves 102A1 and 102A2; a trigger switch 104 that snap fits within and pivots within a pair of spaced apart apertures provided in the housing halves; a light transmission window panel 103A through which light transmission window 103 is formed and supported within a recess formed by handle halves 102A1 and 102A2; and a top head portion 102B1 enclosing the head portion 102B of the housing.

The head portion 102B of the housing includes a printed circuit board (PCB) 106 operatively connected to the electro-optical components of indicia-reading system 107.

An internal host-connector cable 105A attaches to the reader 100 via a host connector (i.e., a flexible printed circuit) that connects to the PCB 106. When the gun-style reader 100 is assembled, the internal host-connector cable 105A exits through base cap 102C1. A strain relief 109 for the cable is provided where the internal host-connector cable 105A transitions to an external host-connector cable 105B. Strain relief 109 is typically necessary because the region of the cable exiting the base cap 102C is often subject to high instances of flexing. The host-connector cable 105B can be used for communicating with a host 115 (e.g., a computer) and for supplying power.

In contrast with the typical hand-held indicia-reader shown at FIGS. 1 and 2, an exemplary hand-held indicia-reader 200 of the present invention is illustrated in FIGS. 3 and 4. As depicted in FIG. 3, the handle portion 202A of the hand-held indicia-reader 200 has a unitary-construction (i.e., a unibody formed handle), typically over-molded onto the host-connector cable 205 (e.g., a USB cable) by an injection molding process (i.e., a process where one material is molded onto another material). Other processes for forming the unibody handle may also be used (e.g., blow-molding). The cable 205 includes a PCB connector 208 and a connector 209 for connecting to a host (e.g., a computer).

The trigger 204, shown with the handle portion 202A in FIG. 3, may be a separate component from the handle portion 202A. The trigger 204 may be affixed to the handle portion 202A by installing the trigger 204 from the top side of the cable-integrated handle 202A.

The exemplary handle portion 202A has the advantage of significantly reducing the number of parts used in the typical reader assembly 100 as illustrated in FIG. 2. Accordingly, both part costs and manufacturing time are reduced. An additional benefit of cable-integrated handle 202A is a reduced risk that the internal cable will fail during the life of the indicia-reader.

FIG. 4 depicts an exploded view of an exemplary hand-held indicia-reader 200 according to the present invention. When assembled, the exemplary indicia-reader 200 resembles the typical gun-style reader 100 of FIG. 1.

Hand-held reader 200 includes a head portion 202B having a light transmission window 203. An indicia-reading system 207 is enclosed within the head portion 202B. Indicia-reading system 207 may be implemented as described with reference to indicia-reading system 107. Moreover, head portion 202B includes a printed circuit board (PCB) 206 operatively connected to the electro-optical components of indicia-reading system 207.

The head portion 202B may be designed as an assembly that can be removably attached to the handle portion 202A by fasteners 210 (e.g., threaded fasteners, clamps, clips, pins, etc.). In this regard, the handle 202A and trigger 204 portions may attach to the head portion 202B by way of a mating mechanism for any number of scanner head types having various functionalities (e.g., 2D, laser, linear imager, long range, DPM, etc.). Therefore, a user wishing to switch scanner types could choose the appropriate head device for the desired purpose rather than choosing another complete indicia-reader.

To supplement the present disclosure, this application incorporates entirely by reference the following patents, patent application publications, and patent applications: U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,819; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,559,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,593,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; International Publication No. 2013/163789; International Publication No. 2013/173985; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0225757; U.S. Patent Application Publication No. 2011/0169999; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193407; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0056285; U.S. Patent Application Publication No. 2013/0068840; U.S. Patent Application Publication No. 2013/0070322; U.S. Patent Application Publication No. 2013/0075168; U.S. Patent Application Publication No. 2013/0082104; U.S. Patent Application Publication No. 2013/0175341 U.S. Patent Application Publication No. 2013/0175343; U.S. Patent Application Publication No. 2013/0200158; U.S. Patent Application Publication No. 2013/0256418; U.S. Patent Application Publication No. 2013/0257744; U.S. Patent Application Publication No. 2013/0257759; U.S. Patent Application Publication No. 2013/0270346; U.S. Patent Application Publication No. 2013/0278425; U.S. Patent Application Publication No. 2013/0287258; U.S. Patent Application Publication No. 2013/0292474; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306730; U.S. Patent Application Publication No. 2013/0306731; U.S. Patent Application Publication No. 2013/0306734; U.S. Patent Application Publication No. 2013/0307964; U.S. Patent Application Publication No. 2013/0313324; U.S. Patent Application Publication No. 2013/0313325; U.S. Patent Application Publication No. 2013/0313326; U.S. Patent Application Publication No. 2013/0327834; U.S. Patent Application Publication No. 2013/0341399; U.S. Patent Application Publication No. 2013/0342717; U.S. Patent Application Publication No. 2014/0001267; U.S. Patent Application Publication No. 2014/0002828; U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/736,139 for an Electronic Device Enclosure, filed Jan. 8, 2013 (Chaney); U.S. patent application Ser. No. 13/750,304 for Measuring Object Dimensions Using Mobile Computer, filed Jan. 25, 2013; U.S. patent application Ser. No. 13/771,508 for an Optical Redirection Adapter, filed Feb. 20, 2013 (Anderson); U.S. patent application Ser. No. 13/780,158 for a Distraction Avoidance System, filed Feb. 28, 2013 (Sauerwein); U.S. patent application Ser. No. 13/780,196 for Android Bound Service Camera Initialization, filed Feb. 28, 2013 (Todeschini et al.); U.S. patent application Ser. No. 13/780,271 for a Vehicle Computer System with Transparent Display, filed Feb. 28, 2013 (Fitch et al.); U.S. patent application Ser. No. 13/780,356 for a Mobile Device Having Object-Identification Interface, filed Feb. 28, 2013 (Samek et al.); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/792,322 for a Replaceable Connector, filed Mar. 11, 2013 (Skvoretz); U.S. patent application Ser. No. 13/852,097 for a System and Method for Capturing and Preserving Vehicle Event Data, filed Mar. 28, 2013 (Barker et al.); U.S. patent application Ser. No. 13/885,218 for a Indicia Encoding System with Integrated Purchase and Payment Information, filed Oct. 6, 2013 (Liu et al.); U.S. patent application Ser. No. 13/895,846 for a Method of Programming a Symbol Reading System, filed Apr. 10, 2013 (Corcoran); U.S. patent application Ser. No. 13/902,110 for a System and Method for Display of Information Using a Vehicle-Mount Computer, filed May 24, 2013 (Hollifield); U.S. patent application Ser. No. 13/902,144, for a System and Method for Display of Information Using a Vehicle-Mount Computer, filed May 24, 2013 (Chamberlin); U.S. patent application Ser. No. 13/902,242 for a System For Providing A Continuous Communication Link With A Symbol Reading Device, filed May 24, 2013 (Smith et al.); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930, 913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini); U.S. patent application Ser. No. 14/047, 896 for Terminal Having Illumination and Exposure Control filed Oct. 7, 2013 (Jovanovski et al.) U.S. patent application Ser. No. 14/058,721 for a Terminal Configurable for Use Within an Unknown Regulatory Domain, filed Oct. 21, 2013 (Pease et al.); U.S. patent application Ser. No. 14/035,474 for Augmented-Reality Signature Capture, filed Sep. 24, 2013 (Todeschini); U.S. patent application Ser. No. 14/050, 515 for Hybrid-Type Bioptical, filed Oct. 10, 2013 (Edmonds et al.); U.S. patent application Ser. No. 14/053,175 for Imaging Apparatus Having Imaging Assembly, filed Oct. 14, 2013; U.S. patent application Ser. No. 14/055,234 for Dimensioning System, filed Oct. 16, 2013 (Fletcher); U.S. patent application Ser. No. 14/055,353 for Dimensioning System, filed Oct. 16, 2013 (Giordano et al.); U.S. patent application Ser. No. 14/055,383 for Dimensioning System, filed Oct. 16, 2013 (Li et al.); U.S. patent application Ser. No. 14/050,675 for Apparatus for Displaying Bar Codes from Light Emitting Display Surfaces, filed Oct. 10, 2013 (Horn et al.); U.S. patent application Ser. No. 14/053,314 for Indicia Reader, filed Oct. 14, 2013 (Huck); U.S. patent application Ser. No. 14/058,762 for Terminal Including Imaging Assembly, filed Oct. 21, 2013 (Gomez et al.); U.S. patent application Ser. No. 14/058,831 for System Operative to Adaptively Select an Image Sensor for Decodable Indicia Reading, filed Oct. 21, 2013 (Sauerwein); U.S. patent application Ser. No. 14/062,239 for Chip on Board Based Highly Integrated Imager, filed Oct. 24, 2013 (Toa et al.); U.S. patent application Ser. No. 14/065,768 for Hybrid System and Method for Reading Indicia, filed Oct. 29, 2013 (Meier et al.); U.S. patent application Ser. No. 14/074,746 for Self-Checkout Shopping System, filed Nov. 8, 2013 (Hejl et al.); U.S. patent application Ser. No. 14/074,787 for Method and System for Configuring Mobile Devices via NFC Technology, filed Nov. 8, 2013 (Smith et al.); U.S. patent application Ser. No. 14/082,379 for Method and Apparatus for Compensating Pixel Values in an Imaging, filed Nov. 18, 2013 (Hussey et al.); U.S. patent application Ser. No. 14/082,468 for Encoded Information Reading Terminal with Wireless Path Selection Capability, filed Nov. 18, 2013

(Wang et al.); U.S. patent application Ser. No. 14/082,551 for Power Management Scheme for Portable Data Collection Devices Utilizing Location and Position Sensors, filed Nov. 18, 2013 (Sauerwein et al.); U.S. patent application Ser. No. 14/087,007 for Scanner with Wake-Up Mode, filed Nov. 22, 2013 (Nahill et al.); U.S. patent application Ser. No. 14/087,190 for Optimal Range Indicators for Bar Code Validation, filed Nov. 22, 2013 (Hejl); U.S. patent application Ser. No. 14/093,484 for System for Capturing a Document in an Image Signal, filed Dec. 1, 2013 (Showering); U.S. patent application Ser. No. 14/093,487 for Method and System Operative to Process Color Image Data, filed Dec. 1, 2013 (Li et al.); U.S. patent application Ser. No. 14/093,490 for Imaging Terminal Having Image Sensor and Lens Assembly, filed Dec. 1, 2013 (Havens et al.); U.S. patent application Ser. No. 14/093,624 for Apparatus Operative for Capture of Image Data, filed Dec. 2, 2013 (Havens et al.); U.S. patent application Ser. No. 14/094,087 for Method and System for Communicating Information in an Digital Signal, filed Dec. 2, 2013 (Peake et al.); U.S. patent application Ser. No. 14/101,965 for High Dynamic-Range Indicia Reading System, filed Dec. 10, 2013 (Xian); U.S. patent application Ser. No. 14/107,048 for Roaming Encoded Information Reading Terminal, filed Dec. 16, 2013 (Wang et al.); U.S. patent application Ser. No. 14/118,400 for Indicia Decoding Device with Security Lock, filed Nov. 18, 2013 (Liu);U.S. patent application Ser. No. 14/138,206 for System and Method to Store and Retrieve Identifier Associated Information, filed Dec. 23, 2013 (Gomez et al.); U.S. patent application Ser. No. 14/143,399 for Device Management Using Virtual Interfaces, filed Dec. 30, 2013 (Caballero).

In the specification and/or figures, typical embodiments and environments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An indicia-reading device, comprising:
   an indicia-capturing subsystem for acquiring information about indicia within the indicia-capturing subsystem's field of view;
   an indicia-decoding subsystem configured for decoding indicia information acquired by the indicia-capturing subsystem; and
   a hand-supportable housing comprising a head portion, a handle portion removably attached to the head portion via a mating mechanism, and a host-connector cable having at least one connector end wherein (i) the head portion substantially encloses the indicia-capturing subsystem and the indicia-decoding subsystem, (ii) the handle is formed as a unitary-construction, (iii) the handle integrates and surrounds a portion of the host-connector cable, and (iv) the at least one connector end of the host-connector cable extends from the upper portion of the handle.

2. The indicia-reading device according to claim 1, wherein the mating mechanism comprises fasteners, threaded fasteners, clamps, clips, and/or pins.

3. The indicia-reading device according to claim 1, wherein the host-connector cable has a first end connector at an upper portion of the handle and a second end connector at a base portion of the handle.

4. The indicia-reading device according to claim 3, wherein the indicia-capturing subsystem comprises a printed circuit board operatively connected to electro-optical components.

5. The indicia-reading device according to claim 4, wherein the first end connector is operatively connected to the printed circuit board.

6. The indicia-reading device according to claim 5, wherein the second end connector is operatively connected to a host.

7. The indicia-reading device according to claim 6, wherein the host is a computer.

8. The indicia-reading device according to claim 1, wherein the indicia-capturing subsystem comprises a laser-scanning subsystem and/or an imaging subsystem.

9. The indicia-reading device according to claim 1, wherein the hand-supportable housing's unitary-construction handle is an injection-molded handle.

10. The indicia-reading device according to claim 1, wherein the hand-supportable housing's unitary-construction handle is a blow-molded handle.

11. An indicia-reading device, comprising:
    a hand-supportable housing, comprising a head portion and a handle portion removably attached to the head portion via a mating mechanism;
    wherein the head portion at least partially encloses an indicia-capturing system, the indicia-capturing system comprising (i) an indicia-capturing subsystem for acquiring information about indicia within the indicia-capturing subsystem's field of view, and (ii) an indicia-decoding subsystem configured for decoding indicia information acquired by the indicia-capturing subsystem;
    wherein the handle portion physically integrates and surrounds a portion of a host-connector cable forming a single part, the host-connector cable having at least one connector end; and
    wherein the at least one connector end of the host-connector cable extends from the upper portion of the handle.

12. The indicia-reading device according to claim 11, wherein the host-connector cable has a first end connector at an upper portion of the handle and a second end connector at a base portion of the handle.

13. The indicia-reading device according to claim 12, wherein the indicia-capturing system comprises a printed circuit board operatively connected to electro-optical components.

14. The indicia-reading device according to claim 13, wherein the first end connector is operatively connected to the printed circuit board.

15. The indicia-reading device according to claim 14, wherein the second end connector is operatively connected to a host.

16. The indicia-reading device according to claim 15, wherein the host is a handheld computer.

17. The indicia-reading device according to claim 11, wherein the mating mechanism comprises fasteners, threaded fasteners, clamps, clips, and/or pins.

18. The indicia-reading device according to claim 11, wherein the indicia-capturing subsystem comprises a laser-scanning subsystem and/or an imaging subsystem.

19. A method for reading indicia, comprising:
    providing an indicia-reading device that includes (i) an indicia-capturing subsystem for acquiring information about indicia within the indicia-capturing subsystem's field of view, (ii) an indicia-decoding subsystem configured for decoding indicia information acquired by the indicia-capturing subsystem, (iii) a hand-supportable housing having a head portion removably attached to a handle portion, wherein the head portion substantially encloses the indicia-capturing subsystem and the indicia-decoding subsystem and the handle is formed as a unitary-construction, and (iv) a host-connector cable having at least one connector end, a portion of the host-connector cable being integrated into and surrounded by the hand-supportable housing's unitary-construction handle, and the at least one connector end extending from the upper portion of the handle;

operatively connecting the host-connector cable to a host; and using the indicia-reading device to acquire indicia information.

20. The method for reading indicia according to claim 19, comprising communicating the indicia information from the indicia-reading device to the host via the host-connector cable.

\* \* \* \* \*